US011537930B2

(12) United States Patent
Sato

(10) Patent No.: US 11,537,930 B2
(45) Date of Patent: Dec. 27, 2022

(54) INFORMATION PROCESSING DEVICE, INFORMATION PROCESSING METHOD, AND PROGRAM

(71) Applicant: NEC Corporation, Tokyo (JP)

(72) Inventor: Atsushi Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 902 days.

(21) Appl. No.: 14/770,889

(22) PCT Filed: Nov. 1, 2013

(86) PCT No.: PCT/JP2013/079688
§ 371 (c)(1),
(2) Date: Aug. 27, 2015

(87) PCT Pub. No.: WO2014/136316
PCT Pub. Date: Sep. 12, 2014

(65) Prior Publication Data
US 2016/0012351 A1    Jan. 14, 2016

(30) Foreign Application Priority Data

Mar. 4, 2013    (JP) .............................. JP2013-042014

(51) Int. Cl.
*G06N 20/00*    (2019.01)
(52) U.S. Cl.
CPC ................... *G06N 20/00* (2019.01)
(58) Field of Classification Search
CPC .................................................. G06N 99/005
See application file for complete search history.

(56) References Cited

U.S. PATENT DOCUMENTS 5,640,492 A  *  6/1997  Cortes .................... G06N 20/10
706/20
7,490,071 B2 *  2/2009  Milenova ............. G06K 9/6253
706/45

(Continued)

FOREIGN PATENT DOCUMENTS

JP          06-333052 A       12/1994
JP       2006/073081 A1        7/2006

(Continued)

OTHER PUBLICATIONS

Chapelle, O., Sindhwani, V., & Keerthi, S. S. (2008). Optimization techniques for semi-supervised support vector machines. Journal of Machine Learning Research, Feb. 9, 203-233. (Year: 2008).*

(Continued)

*Primary Examiner* — Michael J Huntley
*Assistant Examiner* — Oluwatosin O Alabi

(57) ABSTRACT

An information processing device which performs semi-supervised learning is provided with: a dictionary input circuit for acquiring a dictionary, a parameter group used by an identification device; a boundary determination circuit which obtains an identification boundary for the dictionary on the basis of the dictionary, supervised data, and labelled unsupervised data; a labelling circuit which labels the unsupervised data in accordance with the identification boundary; a loss calculation circuit which calculates the sum total of supervised-data loss calculated in accordance with the labels assigned in advance and the labels based on the identification boundary, and unsupervised-data loss calculated such that further from the identification boundary the smaller the loss; a dictionary update circuit which updates the dictionary such that the sum-total loss is reduced; and a dictionary output circuit which outputs the updated dictionary.

17 Claims, 12 Drawing Sheets

(56) References Cited

U.S. PATENT DOCUMENTS

| | | | | |
|---|---|---|---|---|
| 8,527,432 | B1* | 9/2013 | Guo | G06N 99/005 706/12 |
| 2005/0049990 | A1* | 3/2005 | Milenova | G06K 9/6253 706/48 |
| 2007/0265991 | A1* | 11/2007 | Collobert | G06K 9/6287 706/16 |
| 2012/0004116 | A1* | 1/2012 | Tsao | C12Q 1/6886 506/7 |
| 2012/0150531 | A1* | 6/2012 | Bangalore | G06F 17/28 704/9 |
| 2013/0132315 | A1* | 5/2013 | Principe | G06K 9/6215 706/20 |
| 2017/0011279 | A1* | 1/2017 | Soldevila | G06K 9/66 |

FOREIGN PATENT DOCUMENTS

| | | |
|---|---|---|
| JP | 2009-75737 A | 4/2009 |
| JP | 2009-211693 A | 9/2009 |
| JP | 2010-282275 A | 12/2010 |
| JP | 2011-065579 A | 3/2011 |

OTHER PUBLICATIONS

Chang, K. W., Hsieh, C. J., & Lin, C. J. (2008). Coordinate descent method for large-scale I2-loss linear support vector machines. Journal of Machine Learning Research, Jul. 9, 1369-1398. (Year: 2008).*

Wang Z, Yan S, Zhang C. Active learning with adaptive regularization. Pattern Recognition. Oct. 1, 2011;44(10-11):2375-83. (Year: 2011).*

Xiaojin Zhu & Andrew B. Goldberg, "Introduction to Semi-Supervised Learning", Morgan & Claypool Publishers, 2009, cited in the Specification.

T. Joachims, "Transductive Inference for Text Classification using Support Vector Machines", 16th ICML, pp. 200-209, 1999, cited in the Specification.

International Search Report for PCT Application No. PCT/JP2013/079688, dated Jan. 7, 2014.

English translation of Written opinion for PCT Application No. PCT/JP2013/079688.

* cited by examiner

INFORMATION PROCESSING DEVICE, INFORMATION PROCESSING METHOD, AND PROGRAM

This application is a National Stage Entry of PCT/JP2013/079688 filed on Nov. 1, 2013, which claims priority from Japanese Patent Application 2013-042014 filed on Mar. 4, 2013, the contents of all of which are incorporated herein by reference, in their entirety.

TECHNICAL FIELD

The present invention relates to an information processing device, an information processing method, and a program for performing semi-supervised learning by using supervised data and unsupervised data.

BACKGROUND ART

Semi-supervised learning can realize a higher identification accuracy by learning an identification device with the use of both supervised data and unsupervised data than by learning an identification device with the use of only supervised data. Supervised data is data composed of a sample group to which a correct-answer class is assigned as a label, and unsupervised data is data composed of a sample group to which a correct-answer class is unassigned.

A method called Self-Training or Co-training as representative semi-supervised learning is described in NPL 1. This is a method assuming that "a class determined by the identification device with a high confidence level is correct," and can be advantageously used for any identification device. In addition, a method of using a similarity graph or a manifold (NPL 1, PTL 1), a method of assuming a label generation model (PTL 2), a method of searching a determination boundary by which a margin between samples is maximized (NPL 2), and the like, are proposed. However, these methods are a semi-supervised learning method for a particular identification device, and not a general-purpose method which can be used for any identification device. PTL 3 discloses a standard pattern learning device in which a labeled learning data and an unlabeled learning data are used to learn an identification model parameter and a generation model parameter, and each parameter is calculated under a restriction of a penalty to be applied, when both of the models deviate from each other. PTL 4 discloses, in learning vector quantization 2 (LVQ2), a method of setting an identification plane, which is prone to be set at a position biased towards a certain category, in the vicinity of the center between categories.

The self-training which is a technique related to the present invention will be described below with reference to FIG. 2. FIG. 2 is a block diagram illustrating a processing configuration example of a semi-supervised learning device 20 according to a related art. As illustrated in FIG. 2, the semi-supervised learning device 20 according to the related art is configured to include a dictionary input circuit 201, a dictionary learning circuit 202, a determination circuit 203, a label assignment circuit 204, a dictionary output circuit 205, and a data storage 206, and supervised data 207 and unsupervised data 208 are stored in the data storage 206.

The semi-supervised learning device 20 according to the related art having such a configuration operates in a manner described below. In other words, the dictionary input circuit 201 loads into a memory an initial value of a dictionary composed of a parameter group used in an identification device, and the dictionary learning circuit 202 uses the supervised data 207 stored in the data storage 206 and the unsupervised data 208 to which a label is assigned in the label assignment circuit 204 to learn the dictionary. The determination circuit 203 uses the dictionary learned in the dictionary learning circuit 202 to recognize the unsupervised data 208, and searches for a class determined to be in the first place with respect to each sample and a confidence level thereof. The label assignment circuit 204 assigns to the samples the class determined to be in the first place by the determination circuit 203 with respect to samples of the unsupervised data 208 determined with a sufficiently high confidence level. The dictionary learning circuit 202 uses the unsupervised data 208 and the supervised data 207, to which these labels are assigned, to repeat further learning the dictionary. When termination conditions of no existence or the like of unsupervised data which assigns a new label by the label assignment circuit 204 are satisfied, the dictionary output circuit 205 outputs the dictionary after learning in the memory to a hard disk and the like.

CITATION LIST

Patent Literature

PTL 1: Japanese Laid-open Patent Publication No. 2009-211693
PTL 2: Japanese Laid-open Patent Publication No. 2010-282275
PTL 3: Japanese Laid-open Patent Publication No. 2011-065579
PTL 4: Japanese Laid-open Patent Publication No. H06-333052

Non Patent Literature

NPL 1: Xiaojin Zhu & Andrew B. Goldberg, "Introduction to Semi-Supervised Learning", Morgan & Claypool Publishers, 2009.
NPL 2: T. Joachims, "Transductive Inference for Text Classification using Support Vector Machines", 16th ICML, pp. 200-209, 1999.

SUMMARY OF INVENTION

Technical Problem

The method as described above has a problem in that not all the samples of the unsupervised data are used for learning, and therefore, improvement in accuracy in learning of the dictionary is limited.

This problem will be described in detail with reference to FIGS. 3-6. FIGS. 3-6 are diagrams for describing a flow of the semi-supervised learning according to the related art. FIG. 3 illustrates an example of two dimensional data of two classes. Supervised data indicated by square is provided such that correct-answer classes to which the supervised data is to belong are marked in black or gray. On the other hand, unsupervised data indicated in circle in white is data to which correct-answers as illustrated in FIG. 4 are to be originally provided, but the correct-answers are assumed not to be provided for some reason.

In the method according to the related art, as illustrated in FIG. 5, the semi-supervised learning is performed by repeating learning processing and recognition processing. In other words, in the first learning step, an identification boundary is set by using only the supervised data at a position indicated by a broken line, and the unsupervised data is recognized by using this identification boundary to perform a class determination. In the vicinity of the identification boundary as shadowed, the confidence level is low (i.e. an error is prone to be made) so that classes are assigned only to samples positioned outside a shadowed area from among the unsupervised data. Then, in the second learning step, an identification boundary is set by using the supervised data and the unsupervised data to which the classes are assigned, and the unsupervised data is recognized by using this identification boundary to perform the class determination. At this time, although samples of the unsupervised data to which a label has not been assigned exist, when these samples are within a shadowed area (i.e. the confidence level is low), samples to which a label is assigned anew are judged to be non-existent, and the semi-supervised learning will be terminated. In this way, in the method according to the related art, not all the samples contained in the unsupervised data are used for learning. Therefore, the processing is terminated before an original correct-answer class is obtained as is clear in comparison with FIG. 4, and there remains a room for improvement in accuracy in learning a dictionary.

Further, an example, in which the classes are assigned to samples having a low confidence level out of the unsupervised data, is illustrated in FIG. 6. In this example, in the first determination, classes are assigned to all the samples contained in the unsupervised data so that all the samples are judged to be correctly identified and the learning will be terminated. In this way, in the method according to the related art, even if classes are assigned to samples having a low confidence level, the processing is terminated before an original correct-answer class is obtained as is clear in comparison with FIG. 4, and there remains a room for improvement in accuracy in learning a dictionary.

The present invention has been made in view of the above, and is to provide an information processing device, an information processing method, and a program for performing semi-supervised learning which improved accuracy in learning a dictionary.

Solution to Problem

A first exemplary embodiment of the present invention relates to an information processing device. An information processing device which uses supervised data and unsupervised data to perform semi-supervised learning, the information processing device includes, a dictionary input circuit configured to obtain a dictionary that includes a parameter group used in an identification device, a boundary determination circuit configured to search for an identification boundary of the dictionary on the basis of the dictionary, the supervised data, and labeled unsupervised data, a label assignment circuit configured to assign a label to the unsupervised data in accordance with the identification boundary a loss calculation circuit configured to calculate a sum of a loss of the supervised data which is calculated in accordance with a label based on the identification boundary and a preassigned label and a loss of the unsupervised data which is calculated in such a manner as to be smaller as more distant from the identification boundary, a dictionary update circuit configured to update the dictionary in such a manner as to decrease the sum of the losses, and a dictionary output circuit configured to output the updated dictionary.

A second exemplary embodiment of the present invention relates to an information processing method. An information processing method is executed by an information processing device which uses supervised data and unsupervised data to perform semi-supervised learning. The information processing method includes, obtaining a dictionary which includes a parameter group used in an identification device, determining an identification boundary of the dictionary on the basis of the dictionary, the supervised data, and labeled unsupervised data, assigning a label to the unsupervised data in accordance with the identification boundary, calculating a sum of a loss of the supervised data which is calculated in accordance with the label based on the identification boundary and a preassigned label and a loss of the unsupervised data which is calculated in such a manner as to be smaller as more distant from the identification boundary, updating the dictionary in such a manner as to decrease the sum of the losses, and outputting the updated dictionary.

Another exemplary embodiment of the present invention may be a program which causes at least one computer to realize a configuration of each exemplary embodiment above, or may be a computer-readable recording medium which stores such a program. This recording medium includes a non-transitory tangible medium.

Advantageous Effects of Invention

According to the present invention, accuracy in learning a dictionary in semi-supervised learning can be improved.

BRIEF DESCRIPTION OF DRAWINGS

The above and other objects, features, and advantages will be more apparent from the preferred exemplary embodiments described below and the following accompanying drawings.

DESCRIPTION OF EMBODIMENTS

Figure 1:
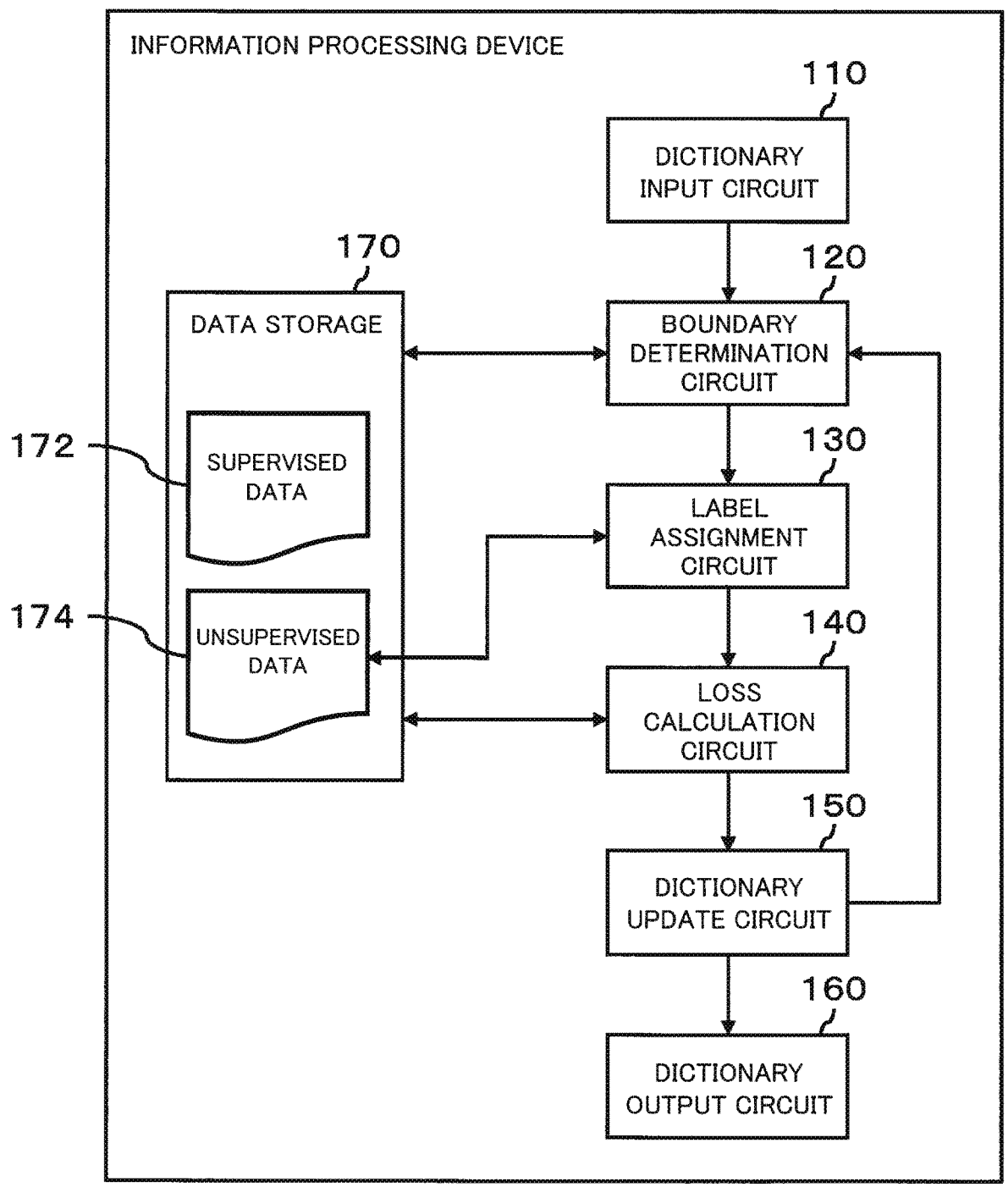
FIG. 1 is a block diagram conceptually illustrating a processing configuration of an information processing device according to a first exemplary embodiment.
Figure 2:
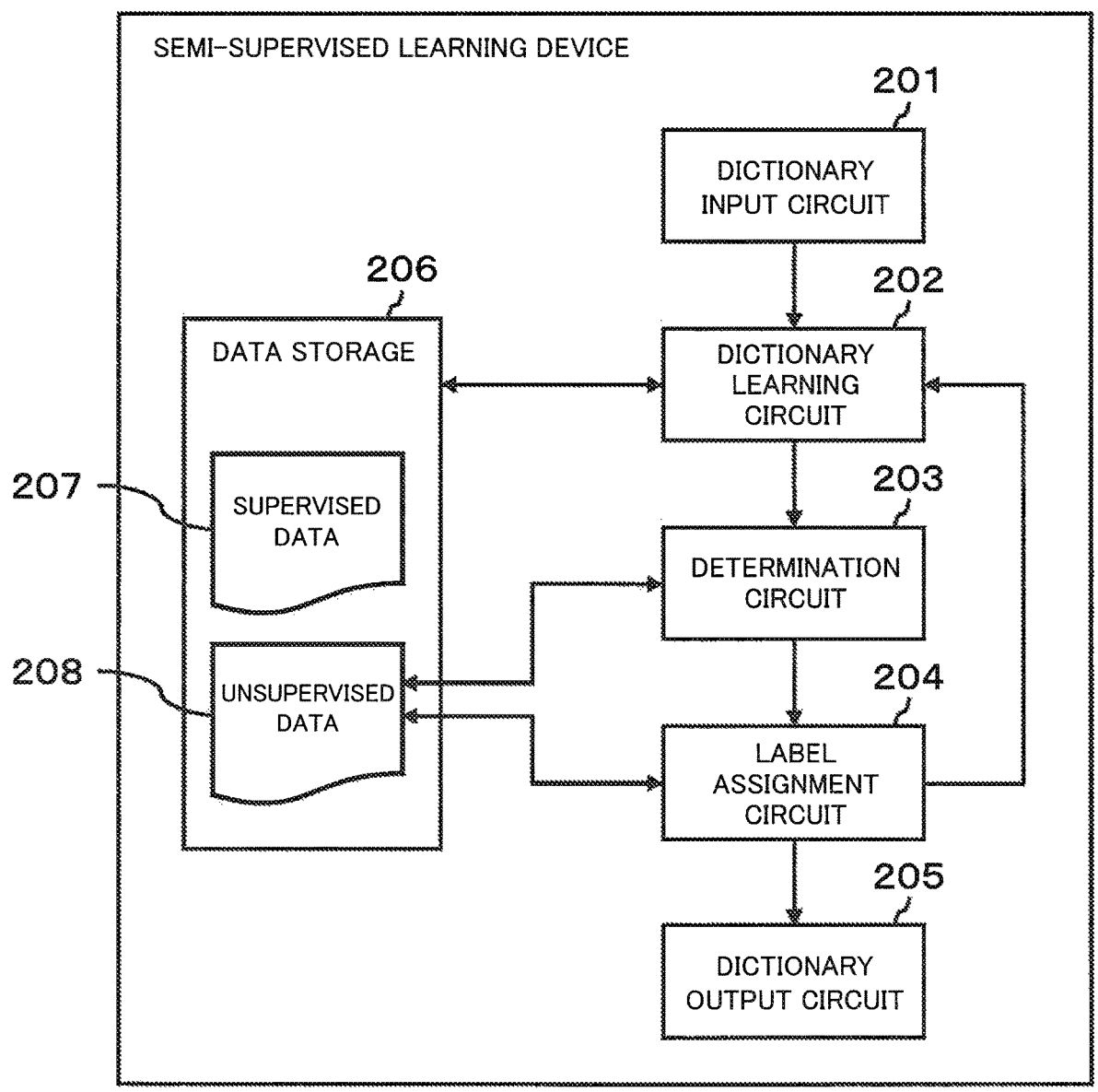
FIG. 2 is a block diagram illustrating a processing configuration example of a semi-supervised learning device according to a related art.
Figure 3:
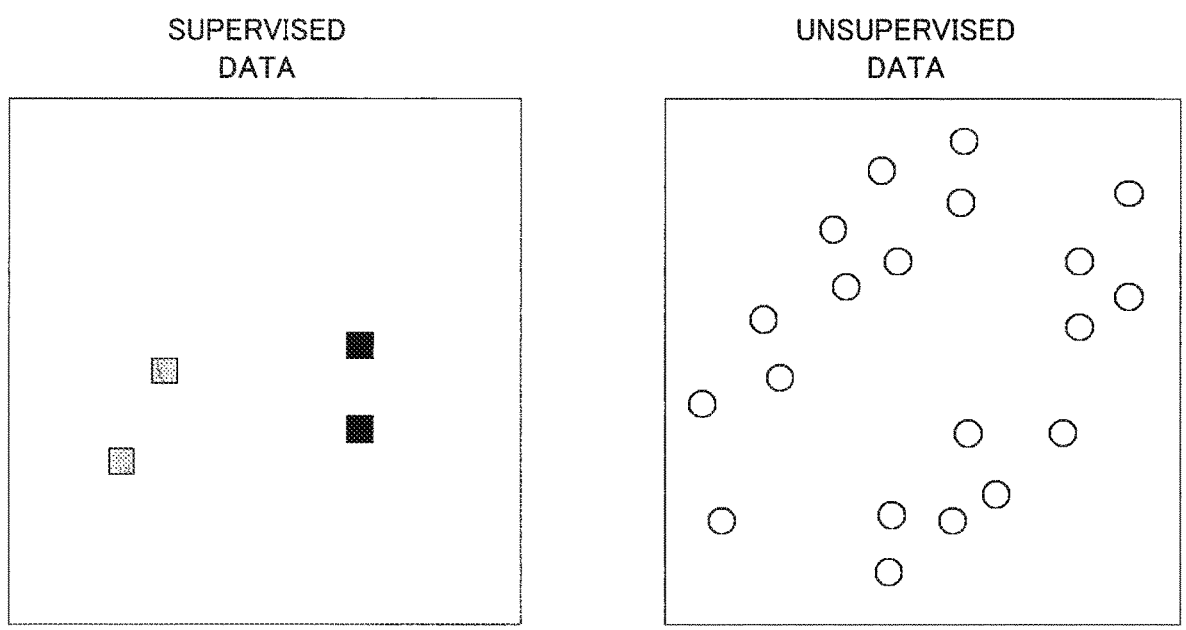
FIG. 3 is a diagram for description of a flow of the semi-supervised learning according to the related art.
Figure 4:
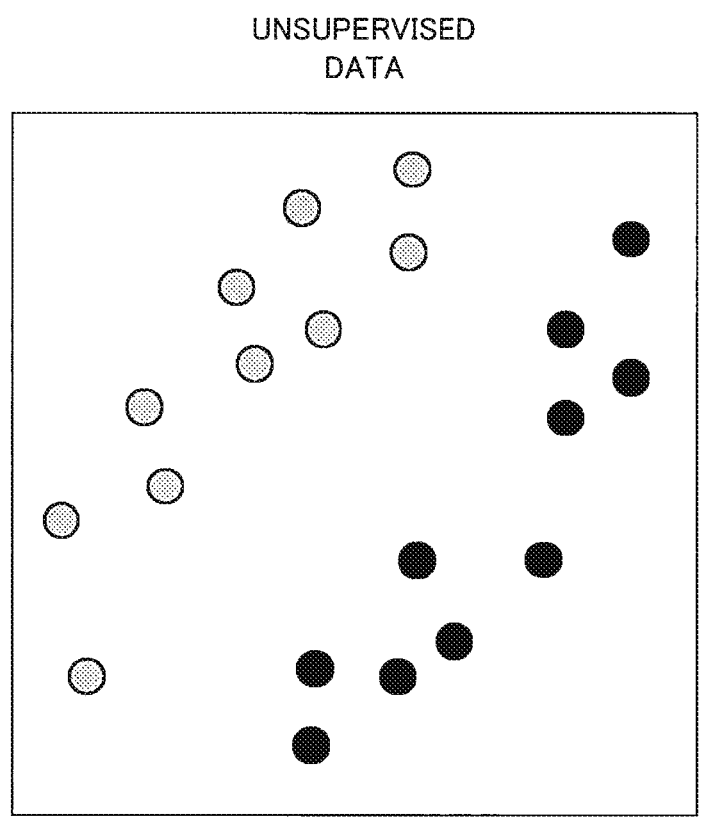
FIG. 4 is a diagram for description of the flow of the semi-supervised learning according to the related art.
Figure 5:
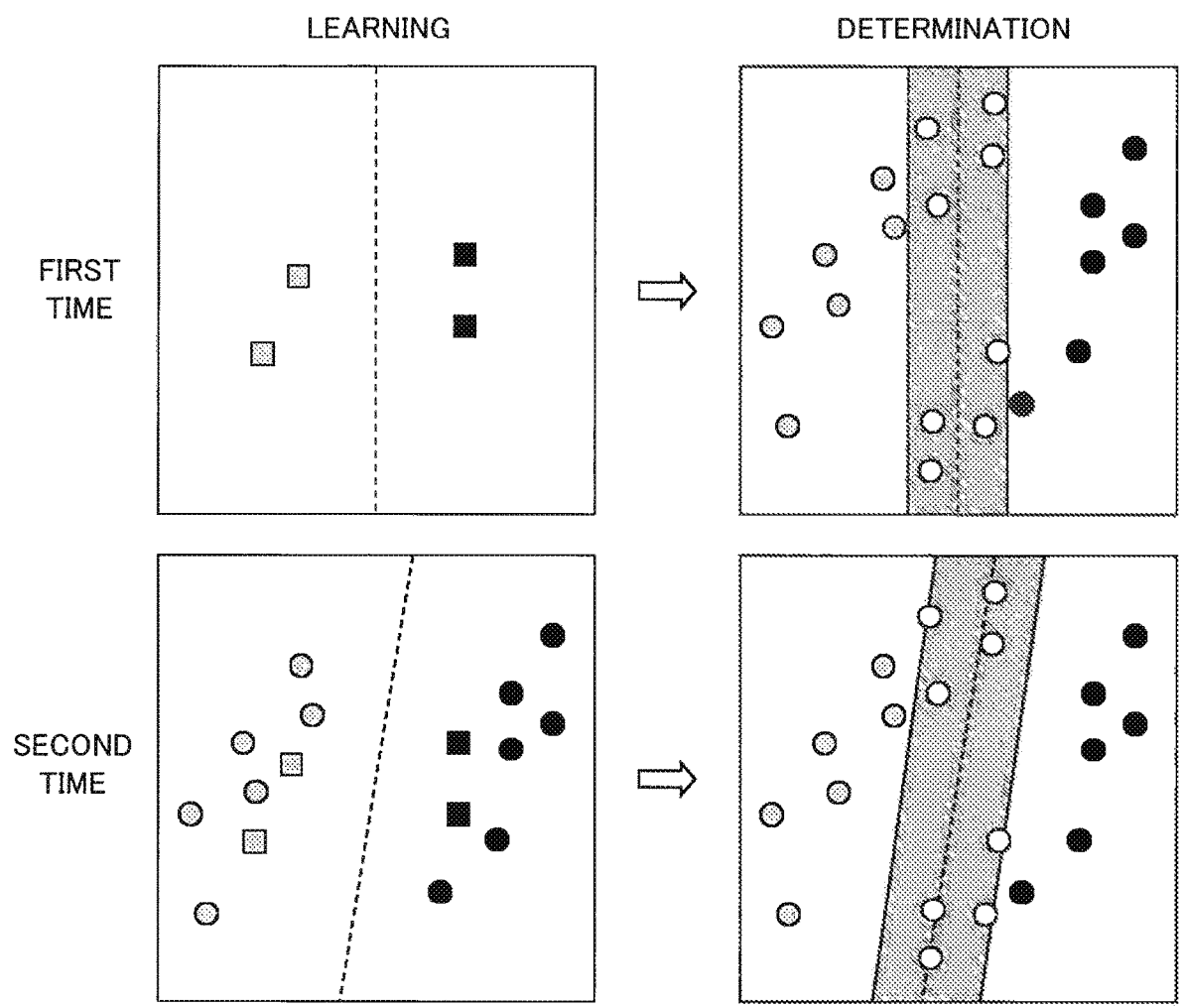
FIG. 5 is a diagram for description of the flow of the semi-supervised learning according to the related art.
Figure 6:
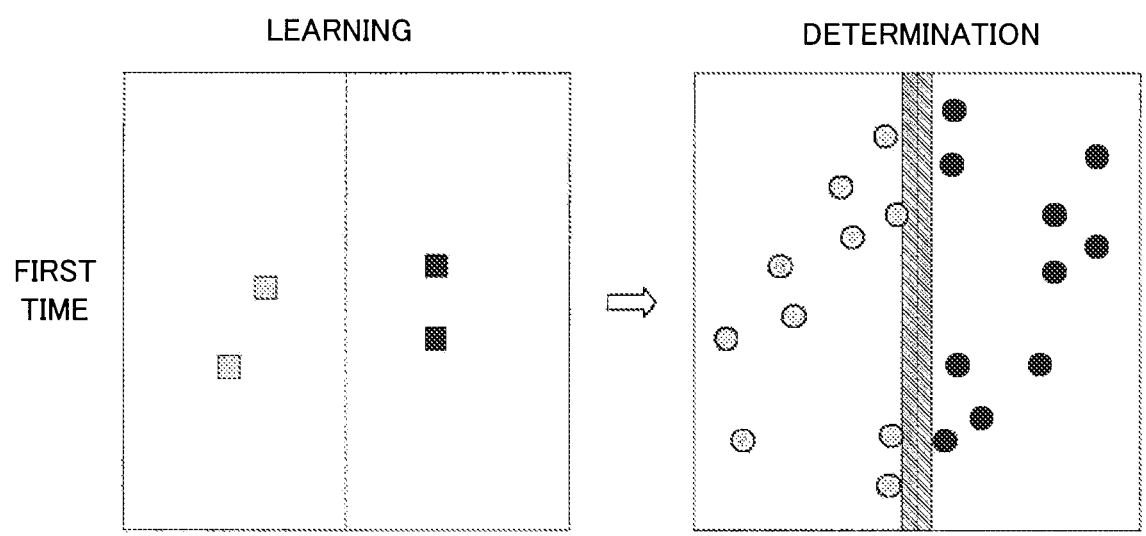
FIG. 6 is a diagram for description of the flow of the semi-supervised learning according to the related art.

Exemplary embodiments of the present invention will be described below. The exemplary embodiments described below are examples, and the present invention is not limited to the configurations of the exemplary embodiments below. In each drawing in the below description, the same or similar constitutional elements will be provided with the same or similar reference numerals, and the description thereof will not be repeated as appropriate.

First Exemplary Embodiment

[Processing Configuration]

FIG. 1 is a block diagram conceptually illustrating a processing configuration of an information processing device 10 according to a first exemplary embodiment. The information processing device 10 uses supervised data 172 and unsupervised data 174 to perform semi-supervised learning. In FIG. 1, the information processing device 10 includes a dictionary input circuit 110, a boundary determination circuit 120, a label assignment circuit 130, a loss calculation circuit 140, a dictionary update circuit 150, a dictionary output circuit 160, and a data storage 170.

The dictionary input circuit 110 obtains an initial value of a dictionary used in the information processing device 10 to load the initial value into a memory and the like, when dictionary learning starts. The "dictionary" herein includes a parameter group used for identifying predetermined data by an identification device. The "parameters" herein, to which the exemplary embodiment is not limited, are a parameter indicating characteristics of a representative pattern recognized as a particular character by the identification device in terms of character recognition, for example. In the dictionary, at least one of these parameters is set, and the identification device identifies unknown data in view of a similarity level of the set parameter.

The data storage 170 stores the supervised data 172 composed of a sample group to which a correct-answer class is assigned as a label and the unsupervised data 174 composed of a sample group to which a correct-answer class is unassigned as a label. The data storage 170 is included in the information processing device 10 in FIG. 1, but may be included in a device other than the information processing device 10.

The boundary determination circuit 120, using the supervised data 172 and labeled unsupervised data 174 which are stored in the data storage 170 to learn the dictionary input into the dictionary input circuit 110, searches for an identification boundary in the dictionary. In other words, the identification boundary and the dictionary are in a mutual relationship, and when the dictionary is updated by the dictionary update circuit 150 as described below, the identification boundary also varies.

The label assignment circuit 130 assigns a label to the unsupervised data 174. In detail, the label assignment circuit 130, first, uses the identification boundary determined by the boundary determination circuit 120 to specify a label to be assigned to the unsupervised data 174. Then, the label assignment circuit 130 assigns the specified label to the unsupervised data 174.

The loss calculation circuit 140 calculates a total sum of a loss of the supervised data 172 and a loss of the labeled unsupervised data 174 which are stored in the data storage 170. In detail, the loss calculation circuit 140 calculates a loss which weights the identification boundary with respect to the unsupervised data 174. The "loss which weights the identification boundary" means a loss which becomes smaller as more distant from the identification boundary determined by the boundary determination circuit 120. For example, the loss calculation circuit 140 may use such a function as to provide a smaller loss to the unsupervised data 174 as more distant from the identification boundary, and may provide a loss having a predetermined value only to the unsupervised data 174 within a certain range from the identification boundary. Meanwhile, the loss calculation circuit 140 calculates a loss with respect to the supervised data 172 depending on whether or not the supervised data 172 is correctly recognized on the basis of the identification boundary determined by the boundary determination circuit 120. For example, the loss calculation circuit 140 provides a loss to the supervised data 172 when a label which is preassigned to the supervised data 172 and a label determined on the basis of the identification boundary searched for by the boundary determination circuit 120 are different from each other.

The dictionary update circuit 150 updates parameters of the dictionary such that the loss calculated by the loss calculation circuit 140 is small. An algorithm which updates the parameters of the dictionary may employ, for example, a known method and is not particularly limited.

When the dictionary is updated by the dictionary update circuit 150, the boundary determination circuit 120 determines the identification boundary again. Then, the label assignment circuit 130 assigns a label again to the unsupervised data 174 in accordance with the updated identification boundary. Then, the loss calculation circuit 140 recalculates a total sum of a loss of the supervised data 172 and a loss of the labeled unsupervised data 174 on the basis of the updated identification boundary.

The dictionary output circuit 160 outputs the dictionary of the time to a storage area such as hard disk, when such a predetermined condition is satisfied as a loss calculated by the loss calculation circuit 140 after update of the dictionary is not less than a loss before update of the dictionary. When a loss calculated by the loss calculation circuit 140 after update of the dictionary is equal to or smaller than a predetermined value which indicates a certain level of accuracy in learning, the dictionary output circuit 160 may output the dictionary. On the other hand, when the predetermined condition is not satisfied, the dictionary output circuit 160 causes the aforementioned each processing circuit to continue learning processing of the dictionary.

[Operation Example]

Figure 7:
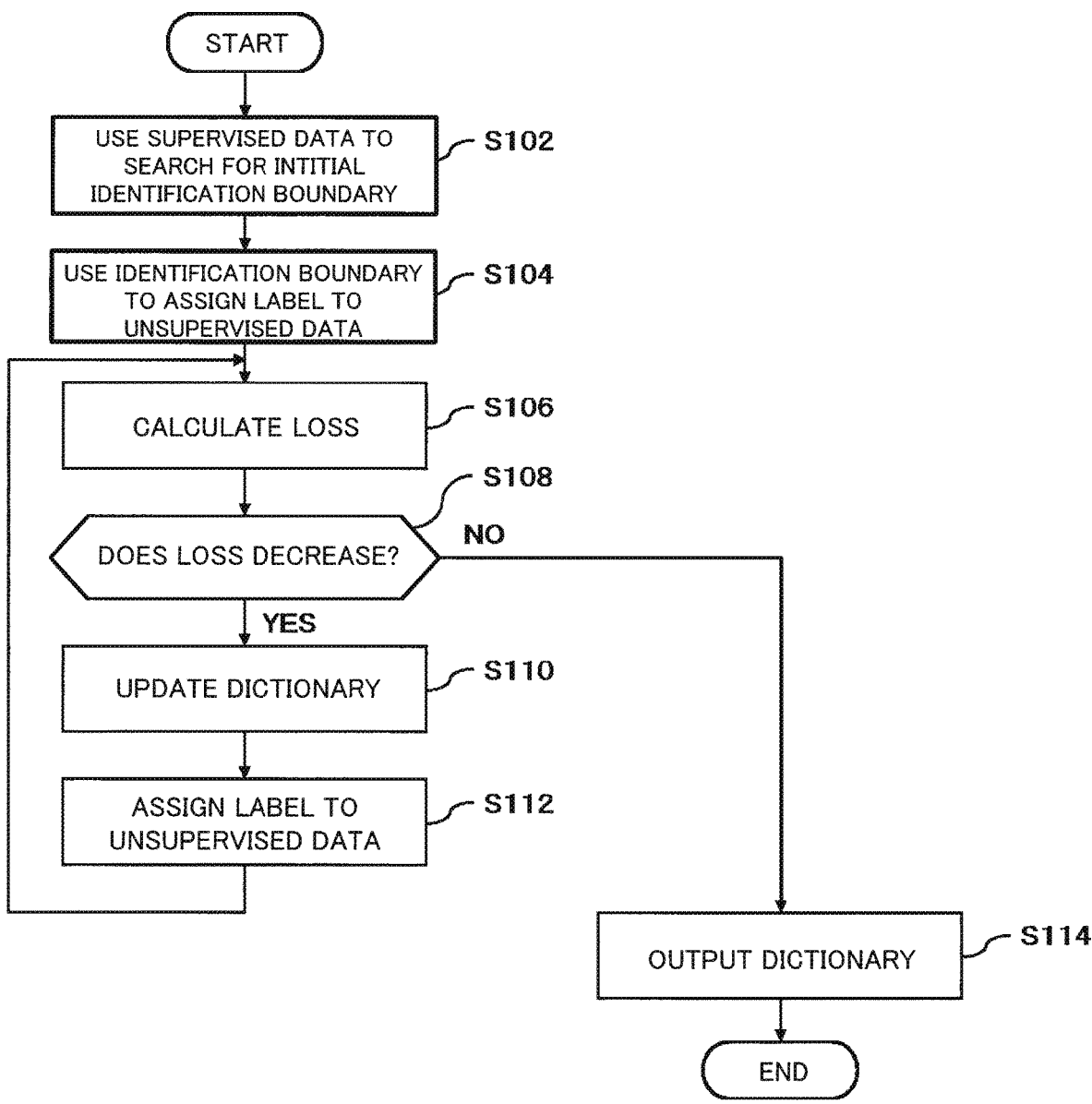
FIG. 7 is a flowchart illustrating an operation example of the information processing device according to the first exemplary embodiment.

An information processing method executed by using the information processing device 10 according to the first exemplary embodiment will be described with reference to FIG. 7. FIG. 7 is a flowchart illustrating an operation example of the information processing device 10 according to the first exemplary embodiment.

The information processing device 10 learns a dictionary input by using the supervised data 172 to search for an initial identification boundary of the dictionary (S102). Then, the information processing device 10 assigns a label to each sample of the unsupervised data in accordance with the identification boundary searched for in S102 (S104). At this time, the information processing device 10 sets a sufficiently large value as a first loss. Then, the information processing device 10 calculates a total sum of a loss of the supervised data and a loss of the unsupervised data which loss weights the identification boundary (S106), which total sum is assumed to be a second loss. In detail, the information processing device 10 uses such a function that a loss becomes smaller as more distant from the identification boundary to calculate the loss with respect to the unsupervised data. Further, the information processing device 10 uses such a function as to provide a loss, when there is an identification error to calculate the loss with respect to the supervised data. Then, the information processing device 10 compares the first loss with the second loss (S108). When the second loss is smaller than the first loss as a result of the comparison (S108: YES), the information processing device 10 updates the dictionary such that the total sum of the loss decreases (S110). At this time, the information processing device 10 replaces the second loss calculated in S106 as a new first loss. At this time, the information processing device 10 uses the updated dictionary, the supervised data 172, and the labeled unsupervised data 174 to search for such an identification boundary as the loss decreases, and causes this to be a new identification boundary. Then, the information processing device 10 determines the unsupervised data 174 to assign a label thereto again in accordance with the new identification boundary (S112). On the other hand, when the second loss fails to become smaller than the first loss (S108: NO), the information processing device 10 outputs the dictionary of the time to a storage area such as hard disk (S114).

Figure 8:
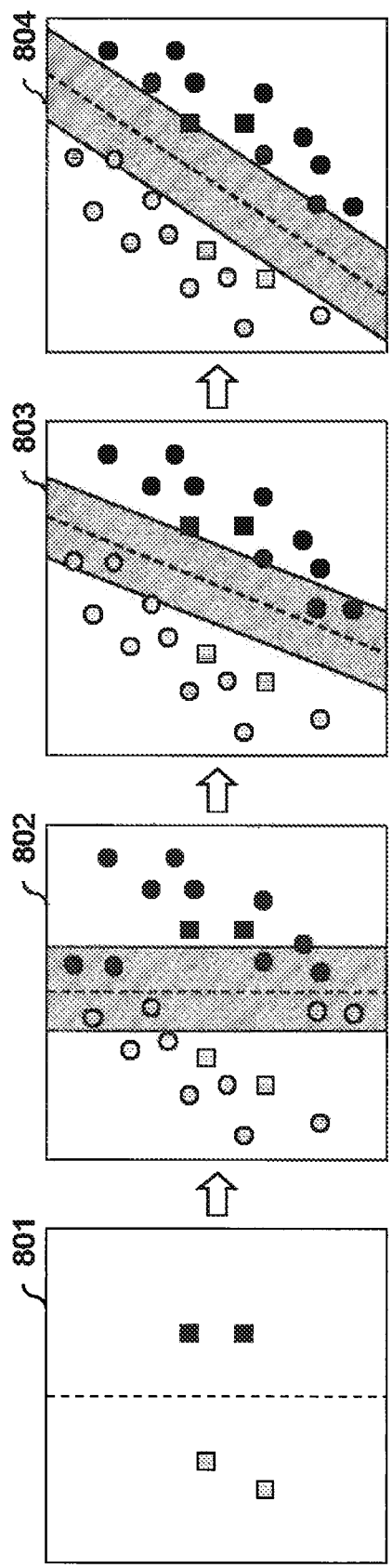
FIG. 8 is a diagram for description of operations of the information processing device according to the first exemplary embodiment.

Next, operations of this exemplary embodiment will be described with reference to FIG. 8. FIG. 8 is a diagram for description of operations of the information processing device 10 according to the first exemplary embodiment. The information processing device 10 uses the dictionary which is input to learn the supervised data, thereby searching for an initial value of an identification boundary (801 in FIG. 8). Then, the information processing device 10 determines a class of each sample of the unsupervised data in accordance with the requested identification boundary, and assigns a label thereto. Then, the information processing device 10 calculates a total sum of a loss of the unsupervised data which loss weights the identification boundary and a loss of the supervised data (802 in FIG. 8). For example, with respect to the unsupervised data, the information processing device 10 provides 1 to samples contained in a shadowed area in the vicinity of the identification boundary, and provides 0 to the other samples as a loss. Meanwhile, with respect to the supervised data, the information processing device 10 provides 1 to samples of an identification error, and provides 0 to the other samples as a loss. Further, the information processing device 10 slightly shifts the identification boundary to determine a class again with respect to each sample of the unsupervised data, and assigns a label thereto. Then, the information processing device 10 recalculates a total sum of a loss of the unsupervised data which weights the identification boundary and a loss of the supervised data on the basis of the updated identification boundary to search for such an identification boundary as the losses decrease (803 in FIG. 8). The information processing device 10 repeats such processing to terminate the processing when the calculated losses no more vary, i.e. the number of samples contained in the shadowed area set in the vicinity of the identification boundary no more varies, and outputs the obtained identification boundary as a dictionary (804 in FIG. 8).

Next, operations of the present invention will be described by using a specific example of the exemplary embodiment. Herein, the supervised data is denoted as $\{x_n, t_n | n=1, \ldots, N\}$. Herein, $x_n$ denotes an n-th sample of the supervised data. Further, $t_n$ denotes a correct-answer class of $x_n$. Still further, N denotes the number of samples of the supervised data. Similarly, the unsupervised data is denoted as $\{z_n | n=1, \ldots, M\}$. Herein, $z_n$ denotes an n-th sample of the unsupervised data. Further, M denotes the number of samples of the unsupervised data. Provided that the number of correct-answer classes is K, a loss $L(\theta)$ is defined by the following Equation 1.

[Math. 1]

$$L(\theta) = \frac{1}{N}\sum_{n=1}^{N}\sum_{k=1}^{K}\sum_{j \neq k}^{K} f(\rho_{kj}(x_n; \theta))1(t_n = \omega_k) + \frac{\lambda}{M}\sum_{n=1}^{M}\sum_{k=1}^{K}\sum_{j \neq k}^{K} f(\rho_{kj}(z_n; \theta))1(r_n(\theta) = \omega_k)$$ (Equation 1)

In the above Equation 1, $\theta$ denotes a parameter group of the identification device called dictionary. Further, $\lambda$ ($\lambda$>0) denotes a weight relative to the unsupervised data. Still further, $1(\ldots)$ denotes an indicator function which returns a predetermined value in response to a truth value. In the specific example of this exemplary embodiment, when a conditional equation in parentheses is true, the indicator function returns 1, and when it is false, the indicator function returns 0. Further, $\omega_k$ denotes a k-th answer class. Still further, $r_n(\theta)$ denotes a class determined by the identification device with respect to $z_n$. In the above Equation 1, $\rho_{kj}(\ldots)$ is defined by the following Equation 2.

[Math. 2]

$$\rho_{kj}(x_n; \theta) = \frac{-g_k(x_n; \theta) + g_j(x_n; \theta)}{g_k(x_n; \theta) + g_j(x_n; \theta)}$$ (Equation 2)

Here, $g_k(\ldots)$ denotes an identification function of a class $\omega_k$. However, a value of the identification function is constantly positive, and it is defined that a class having a higher possibility to belong to has a greater value. In other words, a class $\omega_i$, in which $g_i(\ldots)$ becomes the maximum with respect to $i=1, \ldots, K$, becomes the first place class determined by the identification device. Thus, when $\rho_{kj}(\ldots)$ is negative, it means that x is correctly determined by the class $\omega_k$. Specifically, when $\rho_{kj}(\ldots)$ is negative, it means that a sample $x_n$ or a sample $z_n$ which are objects is positioned on a class $\omega_k$ side based on an identification boundary between the class $\omega_k$ and a class $\omega_j$. Further, when $\rho_{kj}(\ldots)$ is positive, it means that the sample $x_n$ or the sample $z_n$ which are objects is positioned on a class $\omega_j$ side based on the identification boundary between the class $\omega_k$ and the class $\omega_j$. Further, when $\rho_{kj}(\ldots)=0$ is satisfied, it means that the sample $x_n$ or the sample $z_n$ exists at the identification boundary between the class $\omega_k$ and the class $\omega_j$. In other words, a distance of the sample $x_n$ or the sample $z_n$ from the identification boundary can be determined based on $\rho_{kj}(\ldots)$ of this specific example.

Figure 9:
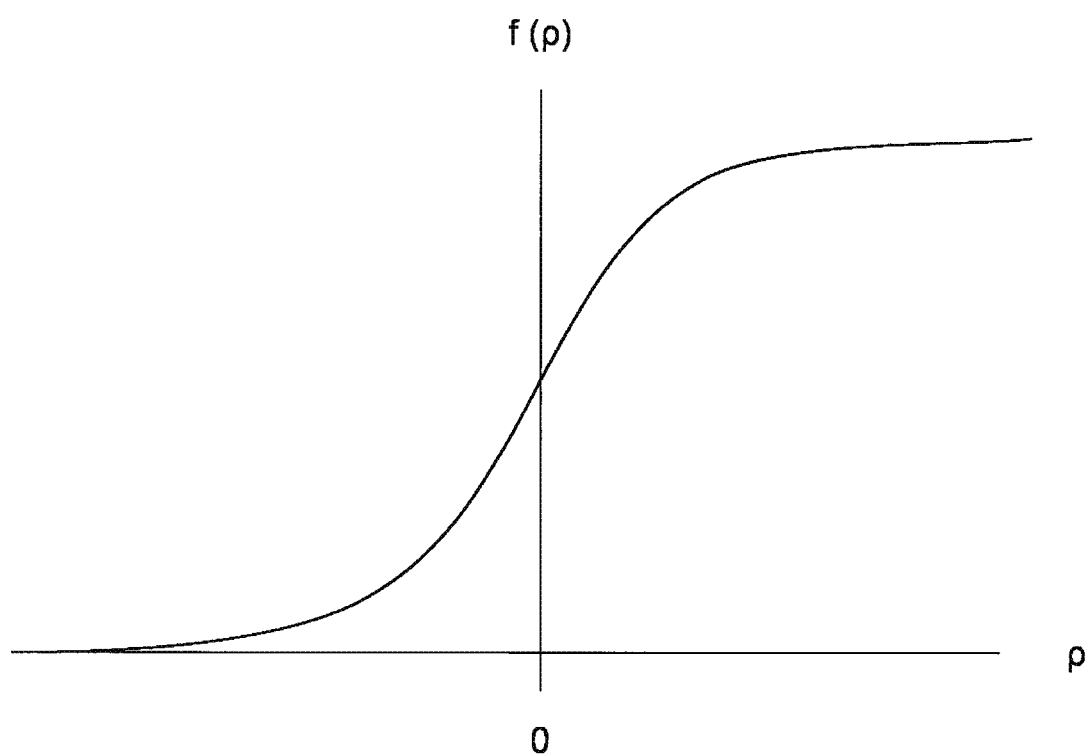
FIG. 9 is a diagram illustrating an example of a sigmoid function used as a loss function.

Here, $f(\ldots)$ is an optional monotonically increasing function which represents the scale of loss, and is a sigmoid function as defined by the below Equation 3, for example. FIG. 9 is a diagram illustrating an example of a sigmoid function used as a loss function.

[Math. 3]

$$f(\rho) = \frac{1}{1 + \exp(-\xi\rho)}$$ (Equation 3)

Here, $\xi$ ($\xi$>0) is a parameter representing the gradient of the sigmoid function. According to the loss function indicated in FIG. 9, a sample of an erroneous recognition ($\rho$>0) is provided with a large loss, and a sample of a correct recognition (ρ<0) is provided with a small loss. The unsupervised data is provided with the first place class determined by the identification device so that each sample of the unsupervised data becomes a correct recognition. Consequently, with respect to the unsupervised data, samples nearer to an identification boundary are provided with a larger loss. This has an effect similar to the loss which weights the identification boundary as indicated by the shadow in FIG. 8.

Further, as f( . . . ) with respect to the unsupervised data, an optional function which monotonically decreases with the identification boundary (ρ=0) at the center, such as a function representing Gaussian distribution, may be used.

To update a dictionary such that the loss L(θ) decreases, a steepest descent method as indicated by the below Equation 4, for example, may be used. Here, $\theta^{(t)}$ denotes a dictionary before update, and $\theta^{(t+1)}$ denotes the dictionary after update. However, in the below Equation 4, ε is a very small positive value.

[Math. 4]

$$\theta^{(t+1)} = \theta^{(t)} - \epsilon \frac{\partial L(\theta)}{\partial \theta}\bigg|_{\theta=\theta^{(t)}}$$ (Equation 4)

Further, in place of using the above Equation 4, such θ that the loss L(θ) decreases may be adopted as a new dictionary by adding an appropriate value to θ so that θ may be changed.

Figure 10:
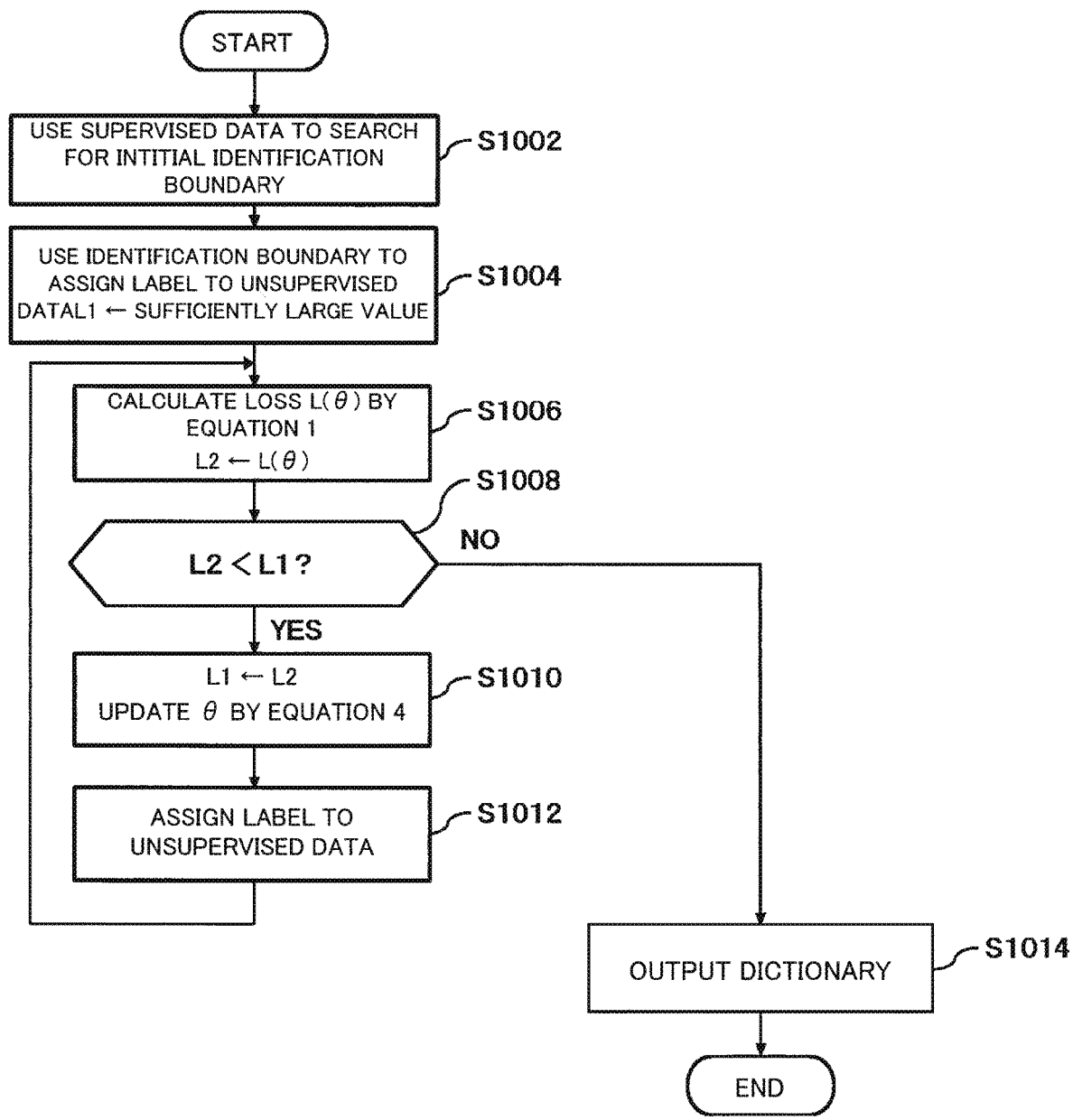
FIG. 10 is a flowchart illustrating a processing flow in a specific example of the exemplary embodiment.

Next, operations of the specific example of this exemplary embodiment will be described with reference to the flowchart as illustrated in FIG. 10. FIG. 10 is a flowchart illustrating a processing flow in the specific example.

The information processing device 10, first, learns a dictionary θ input by using the supervised data 172 to search for an initial identification boundary (S1002). Then, in accordance with the identification boundary searched for, the information processing device 10 assigns a label to the unsupervised data 174. At this time, the information processing device 10 sets a sufficiently large value as a first loss L1 (S1004). Then, the information processing device 10 calculates the loss L(θ) in accordance with the Equation 1 with respect to the supervised data 172 and the unsupervised data 174, which loss is caused to be a second loss L2 (S1006). Then, the information processing device 10 compares the first loss L1 and the second loss L2 (S1008). As a result of the comparison, when the second loss L2 is smaller than the first loss L1 (S1008: YES), the information processing device 10 updates the dictionary θ in accordance with the Equation 4 such that the loss decreases (S1010). At this time, the information processing device 10 replaces the second loss L2 calculated in S1006 as a new first loss L1. At this time, the information processing device 10 uses the updated dictionary θ, the supervised data 172, and the labeled unsupervised data 174 to search for such an identification boundary as to decrease the loss, which is caused to be a new identification boundary. Then, the information processing device 10 determines the unsupervised data 174 in accordance with the new identification boundary to assign a label thereto again (S1012). On the other hand, when the second loss L2 fails to become smaller than the first loss L1 (S1008: NO), the information processing device 10 outputs the dictionary of the time to a storage area such as hard disk (S1014).

Effects of First Exemplary Embodiment

As described above, according to this exemplary embodiment, the unsupervised data in the vicinity of an identification boundary can be also used for learning, and accuracy in learning of semi-supervised learning is improved.

Second Exemplary Embodiment

The second exemplary embodiment is similar to the first exemplary embodiment except the below points.
[Processing Configuration]

Figure 11:
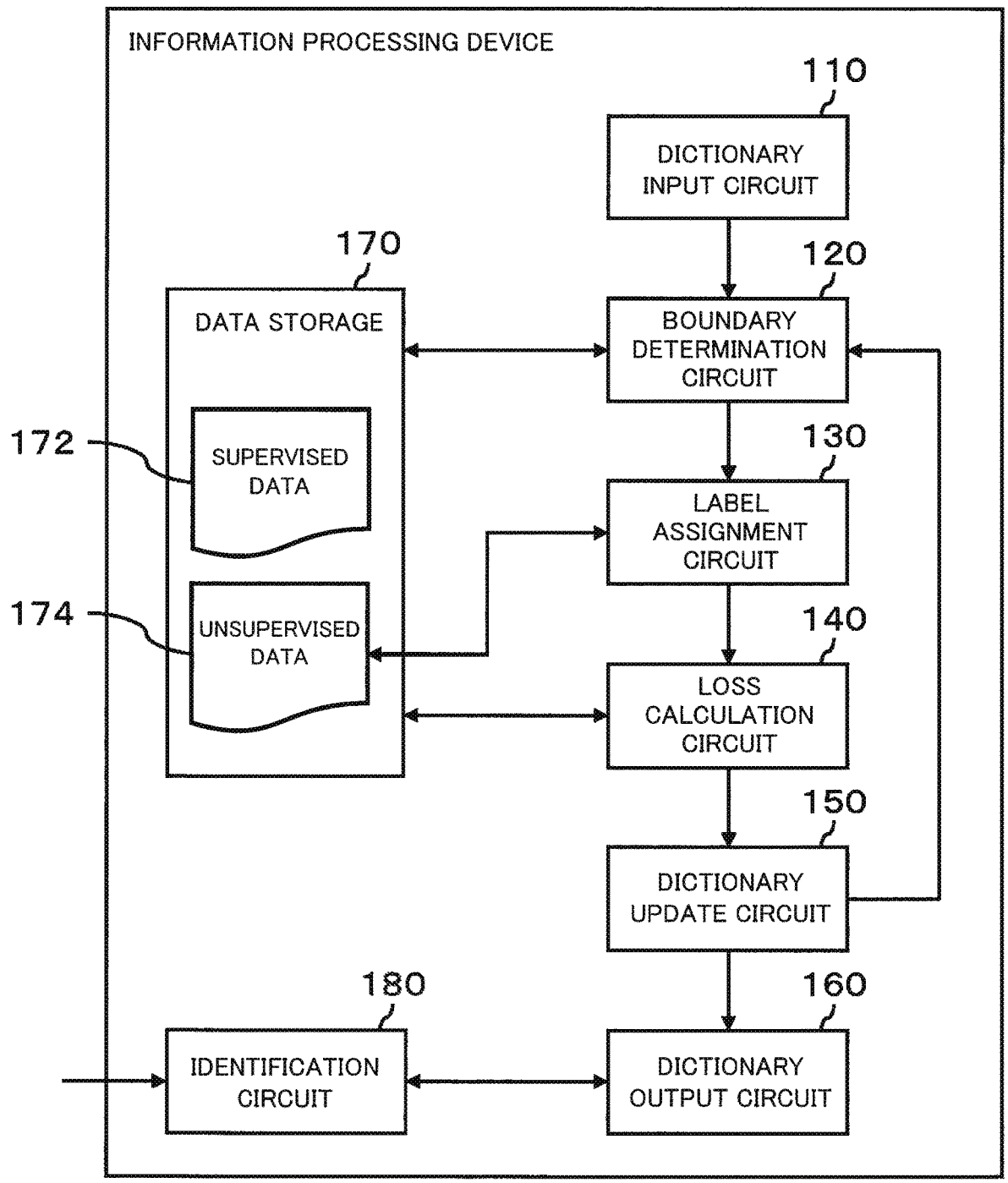
FIG. 11 is a block diagram conceptually illustrating a processing configuration of the information processing device according to a second exemplary embodiment.

FIG. 11 is a diagram conceptually illustrating a processing configuration of the information processing device 10 according to a second exemplary embodiment. In FIG. 11, the information processing device 10 further includes an identification circuit 180.

The identification circuit 180 uses a dictionary output from the dictionary output circuit 160 to perform an identification so as to identify what data subject to identification input to the information processing device 10 belongs to which class.
[Operation Example]

Figure 12:
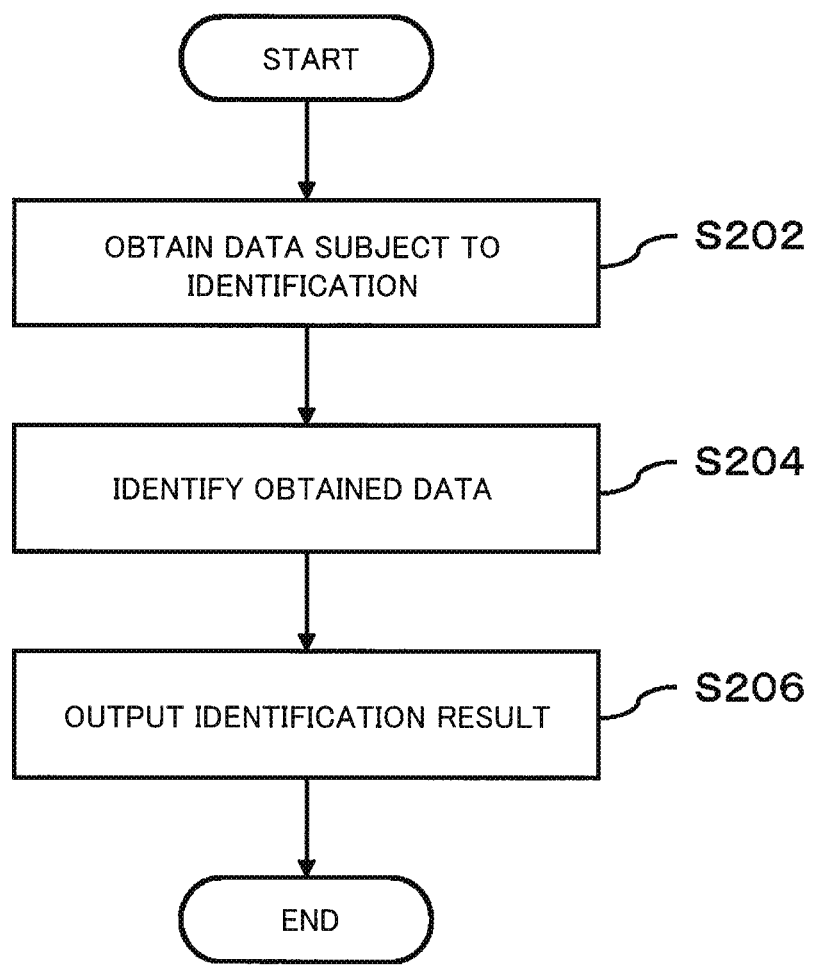
FIG. 12 is a flowchart illustrating an operation example of the information processing device according to the second exemplary embodiment.

An information processing method executed by using the information processing device 10 according to the second exemplary embodiment will be described with reference to FIG. 12. FIG. 12 is a flowchart illustrating an operation example of the information processing device 10 according to the second exemplary embodiment.

The information processing device 10 obtains data subject to identification through input from a user, reading of a predetermined file, and the like (S202). Then, the information processing device 10 uses a dictionary output from the dictionary output circuit 160 to identify the obtained data subject to identification (S204). Then, the information processing device 10 outputs the result of an identification (S206). The information processing device 10 may output the identification result to a display device such as a display, and may output the identification result to a slip by using a printer.

Effects of Second Exemplary Embodiment

As described above, according to this exemplary embodiment, optional data can be identified on the basis of a dictionary learned by the information processing device 10, and an identification result thereof can be presented.

As described above, the exemplary embodiments of the present invention have been described with reference to the accompanying drawings, but these are examples of the present invention, and various configurations other than the above can be also employed.

In the aforementioned exemplary embodiments, the examples of identifying data into two classes have been described for convenience of description, but the present invention can be also applied in a similar manner to a case in which identification into three classes or more is performed.

In the plural flowcharts employed in the above description, plural steps (processes) are described in a sequential order, but an execution order of the steps executed in each exemplary embodiment is not limited to the order of description. In each exemplary embodiment, the illustrated order of steps may be changed as long as it does not interfere with the contents. Further, each of the aforementioned exemplary embodiment may be combined, as long as the contents thereof do not conflict with each other.

Hereinafter, examples of reference modes will be supplementally described.

(Supplementary Note 1)

An information processing device which uses supervised data and unsupervised data to perform semi-supervised learning, the information processing device including:

a dictionary input circuit which obtains a dictionary that includes a parameter group used in an identification device;

a boundary determination circuit for searching for an identification boundary of the dictionary on the basis of the dictionary, the supervised data, and labeled unsupervised data;

a label assignment circuit for assigning a label to the unsupervised data in accordance with the identification boundary;

a loss calculation circuit for calculating a sum of a loss of the supervised data which is calculated in accordance with the label based on the identification boundary and a preassigned label and a loss of the unsupervised data which is calculated in such a manner as to be smaller as more distant from the identification boundary;

a dictionary update circuit for updating the dictionary in such a manner as to decrease the sum of the losses; and a dictionary output circuit for outputting the updated dictionary.

(Supplementary Note 2)

The information processing device according to Supplementary Note 1, wherein the loss calculation circuit uses a function representing Gaussian distribution when calculating the loss of the unsupervised data.

(Supplementary Note 3)

The information processing device according to Supplementary Note 1 or 2, wherein the dictionary update circuit updates the dictionary by using a differential value of the sum of the losses.

(Supplementary Note 4)

The information processing device according to any one of Supplementary Notes 1-3, wherein the dictionary output circuit determines, on the basis of a change amount of the sum of the losses in response to an update of the dictionary, either output of the dictionary or continuation of update of the dictionary.

(Supplementary Note 5)

The information processing device according to any one of Supplementary Notes 1-4, further including an identification circuit for identifying, by using the dictionary, data subject to identification which is input.

(Supplementary Note 6)

An information processing method executed by an information processing device which uses supervised data and unsupervised data to perform semi-supervised learning, the information processing method including steps of, performed by the information processing device:

obtaining a dictionary which includes a parameter group used in an identification device;

determining an identification boundary of the dictionary on the basis of the dictionary, the supervised data, and labeled unsupervised data;

assigning a label to the unsupervised data in accordance with the identification boundary;

calculating a sum of a loss of the supervised data which is calculated in accordance with the label based on the identification boundary and a preassigned label and a loss of the unsupervised data which is calculated in such a manner as to be smaller as more distant from the identification boundary;

updating the dictionary in such a manner as to decrease the sum of the losses; and outputting the updated dictionary.

(Supplementary Note 7)

The information processing method according to Supplementary Note 6, wherein the information processing device uses a function representing Gaussian distribution when calculating the loss of the unsupervised data.

(Supplementary Note 8)

The information processing method according to Supplementary Note 6 or Supplementary Note 7, wherein the dictionary update circuit updates the dictionary by using a differential value of the sum of the losses.

(Supplementary Note 9)

The information processing method according to any one of Supplementary Notes 6-8, wherein the dictionary output circuit determines, on the basis of a change amount of the sum of the losses in response to an update of the dictionary, either output of the dictionary or continuation of update of the dictionary.

(Supplementary Note 10)

The information processing method according to any one of Supplementary Notes 6-9, further including identifying, by using the dictionary, data subject to identification which is input.

(Supplementary Note 11)

A program executed by an information processing device which uses supervised data and unsupervised data to perform semi-supervised learning, the program causing the information processing device to perform:

a dictionary input function of obtaining a dictionary which includes a parameter group used in an identification device;

a boundary determination function of searching for an identification boundary of the dictionary on the basis of the dictionary, the supervised data, and labeled unsupervised data;

a label assignment function of assigning a label to the unsupervised data in accordance with the identification boundary;

a loss calculation function of calculating a sum of a loss of the supervised data which is calculated in accordance with the label based on the identification boundary and a preassigned label and a loss of the unsupervised data which is calculated in such a manner as to be smaller as more distant from the identification boundary;

a dictionary update function of updating the dictionary in such a manner as to decrease the sum of the losses; and a dictionary output function of outputting the updated dictionary.

(Supplementary Note 12)

The program according to Supplementary Note 11, causing the information processing device to perform the loss calculation function in which a function representing Gaussian distribution is used when calculating the loss of the unsupervised data.

(Supplementary Note 13)

The program according to Supplementary Note 11 or 12, causing the information processing device to perform the dictionary update function of updating the dictionary by using a differential value of the sum of the losses.

(Supplementary Note 14)

The program according to any one of Supplementary Notes 11-13, causing the information processing device to perform the dictionary update function of determining, on the basis of a change amount of the sum of the losses in response to an update of the dictionary, either output of the dictionary or continuation of update of the dictionary.

(Supplementary Note 15)

The program according to any one of Supplementary Notes 11-14, causing the information processing device to further perform an identification function of identifying by using the dictionary, data subject to identification which is input.

This application claims priority based on the Japanese Patent Application No. 2013-042014 filed on Mar. 4, 2013 and the disclosure of which is hereby incorporated in its entirety.

What is claimed is:

1. An information processing device which uses supervised data and unsupervised data to perform semi-supervised learning, the information processing device comprising:
at least one memory configured to store instructions, and;
at least one processor configured to execute instructions to:
obtain a dictionary that includes a parameter group used in an identification device;
search for an identification boundary of the dictionary based on the dictionary and the supervised data;
set a first loss for evaluating a loss of the supervised data and the unsupervised data;
assign labels to samples of the unsupervised data in accordance with the identification boundary;
calculate a loss of the supervised data as a supervised loss by applying a function to the supervised data when a preassigned label which is preassigned to the supervised data is different from a determined label determined based on the identification boundary;
calculate a loss of the unsupervised data as an unsupervised loss by giving a predetermined value of loss only to the samples that are within a certain range from the identification boundary among the samples labeled in the unsupervised data;
calculate a sum of the supervised loss and the unsupervised loss, as a second loss;
when the second loss is less than the first loss,
update the dictionary to shift the identification boundary;
replace the first loss with the calculated second loss;
search for a new identification boundary of the dictionary based on the dictionary, the supervised data, and the unsupervised data;
repeat processing from assignment of the labels to the samples of the unsupervised data in accordance with the identification boundary; and
when the second loss is not less than the first loss, output the updated dictionary.

2. The information processing device according to claim 1,
the at least one processor configured to execute the instructions to use a function representing Gaussian distribution when calculating the loss of the unsupervised data.

3. The information processing device according to claim 1,
the at least one processor configured to execute the instructions to update the dictionary by using a steepest descent method.

4. The information processing device according to claim 1,
the at least one processor configured to execute the instructions to determine, based on a change amount of the sum of the supervised loss and the unsupervised loss, and in response to an update of the dictionary, either output the dictionary or again update the dictionary.

5. The information processing device according to claim 1, comprising:
the at least one processor further configured to execute the instructions to identify, by using the dictionary, data subject to identification which is input.

6. The information processing device according to claim 1, wherein
the loss is calculated by using a loss function, and
an explanatory variable of the loss function is the parameter group of the dictionary.

7. The information processing device according to claim 6, wherein
the parameter group is a feature of a representative pattern that is recognized.

8. An information processing method executed by an information processing device which uses supervised data and unsupervised data to perform semi-supervised learning, the information processing method comprising:
obtaining a dictionary which includes a parameter group used in an identification device;
setting a first loss for evaluating a loss of the supervised data and the unsupervised data;
searching an identification boundary of the dictionary based on the dictionary and the supervised data;
assigning labels to samples of the unsupervised data in accordance with the identification boundary;
calculating a loss of the supervised data as a supervised loss by applying a function to the supervised data when a preassigned label which is preassigned to the supervised data is different from a determined label determined based on the identification boundary;
calculating a loss of the unsupervised data as an unsupervised loss by giving predetermined value of loss only to the samples that are within a certain range from the identification boundary among the samples labeled in the unsupervised data, as the unsupervised loss;
calculating a sum of the supervised loss and the unsupervised loss, as a second loss;
when the second loss is less than the first loss,
updating the dictionary to shift the identification boundary;
replacing the first loss with the calculated second loss;
searching for a new identification boundary of the dictionary based on the dictionary, the supervised data, and the unsupervised data;
repeating from assigning the labels to the samples of the unsupervised data in accordance with the identification boundary; and
when the second loss is not less than the first loss, outputting the updated dictionary.

9. The information processing method according to claim 8, wherein the information processing device uses a function representing Gaussian distribution when calculating the loss of the unsupervised data.

10. The information processing method according to claim 8, wherein the information processing device updates the dictionary by using a differential value based on the sum of the supervised loss and the unsupervised loss.

11. The information processing method according to claim 8, wherein the information processing device determines, based on a change amount of the sum of the supervised loss and the unsupervised loss, and in response to an update of the dictionary, either output the dictionary or again update the dictionary.

12. The information processing method according to claim 8, further including:
    identifying, by using the dictionary, data subject to identification which is input.

13. A non-transitory computer readable medium storing a program executed by an information processing device which uses supervised data and unsupervised data to perform semi-supervised learning, the program causing the information processing device to execute:
    obtaining a dictionary which includes a parameter group used in an identification device;
    setting a first loss for evaluating a loss of the supervised data and the unsupervised data;
    searching an identification boundary of the dictionary based on the dictionary and the supervised data;
    assigning labels to samples of the unsupervised data in accordance with the identification boundary;
    calculating a loss of the supervised data as a supervised loss by applying a function to the supervised data when a preassigned label which is preassigned to the supervised data is different from a determined label determined based on the identification boundary;
    calculating a loss of the unsupervised data as an unsupervised loss by giving predetermined value of loss only to the samples that are within a certain range from the identification boundary among the samples labeled in the unsupervised data, as the unsupervised loss;
    calculating a sum of the supervised loss and the unsupervised loss, as a second loss;
    when the second loss is less than the first loss,
        updating the dictionary to shift the identification boundary;
        replacing the first loss with the calculated second loss;
        searching for a new identification boundary of the dictionary based on the dictionary, the supervised data, and the unsupervised data;
        repeating from assigning the labels to the samples of the unsupervised data in accordance with the identification boundary; and
    when the second loss is not less than the first loss, outputting the updated dictionary.

14. The program according to claim 13, causing the information processing device to use a function representing Gaussian distribution when calculating the loss of the unsupervised data.

15. The program according to claim 13, causing the information processing device to update the dictionary by using a differential value based on the sum of the supervised loss and the unsupervised loss.

16. The program according to claim 13, causing the information processing device to determine, based on a change amount of the sum of the supervised loss and the unsupervised loss, and in response to an update of the dictionary, either output the dictionary or again update the dictionary.

17. The program according to claim 13, causing the information processing device to further identify, by using the dictionary, data subject to identification which is input.

* * * * *